(12) United States Patent
Browne et al.

(10) Patent No.: US 8,446,065 B2
(45) Date of Patent: May 21, 2013

(54) TUBULAR ACTUATORS UTILIZING ACTIVE MATERIAL ACTIVATION

(75) Inventors: Alan L. Browne, Grosse Pointe, MI (US); Jan H. Aase, Oakland Township, MI (US); Paul W. Alexander, Ypsilanti, MI (US); Nancy L. Johnson, Northville, MI (US); Xiujie Gao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 12/979,365

(22) Filed: Dec. 28, 2010

(65) Prior Publication Data

US 2012/0161579 A1 Jun. 28, 2012

(51) Int. Cl.
*H01L 41/08* (2006.01)
(52) U.S. Cl.
USPC ............ 310/311; 310/328; 310/369; 310/800

(58) Field of Classification Search
USPC .................... 310/369, 328, 330–332
See application file for complete search history.

(56) References Cited

U.S. PATENT DOCUMENTS

| | | | | |
|---|---|---|---|---|
| 4,432,699 | A | * | 2/1984 | Beckman et al. ............... 417/63 |
| 4,519,751 | A | * | 5/1985 | Beckman et al. ............. 417/322 |
| 4,808,084 | A | * | 2/1989 | Tsubouchi et al. ........... 417/322 |
| 4,874,979 | A | * | 10/1989 | Rapp .............................. 310/328 |
| 4,897,673 | A | * | 1/1990 | Okabayashi et al. ........... 347/68 |
| 5,027,027 | A | * | 6/1991 | Orbach et al. ................ 310/317 |
| 5,268,621 | A | * | 12/1993 | Hamers et al. ................ 318/116 |
| 6,869,275 | B2 | * | 3/2005 | Dante et al. ................ 417/413.2 |

* cited by examiner

*Primary Examiner* — Mark Budd

(57) ABSTRACT

A tubular actuator including a flexible tube or roll, operable to shift between first and second configurations so as to define a stroke, and utilizing active material activation to produce, modify, and/or retain the stroke.

14 Claims, 2 Drawing Sheets

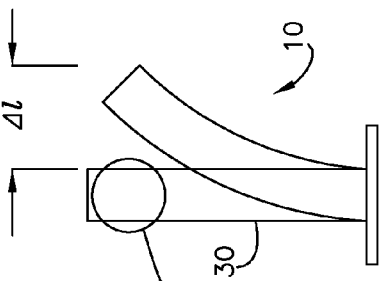
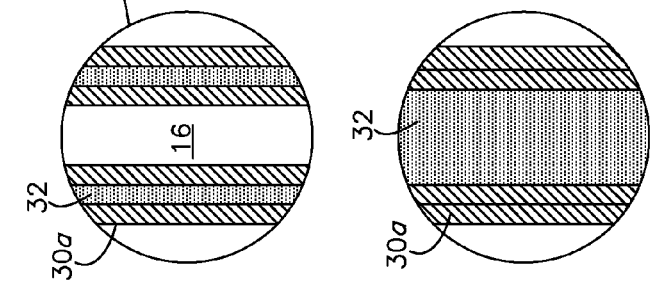
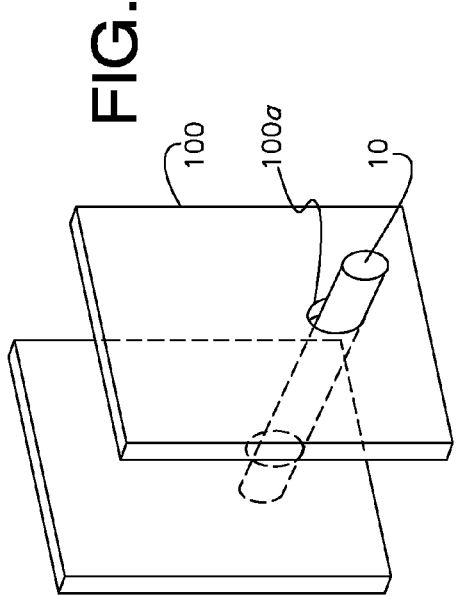
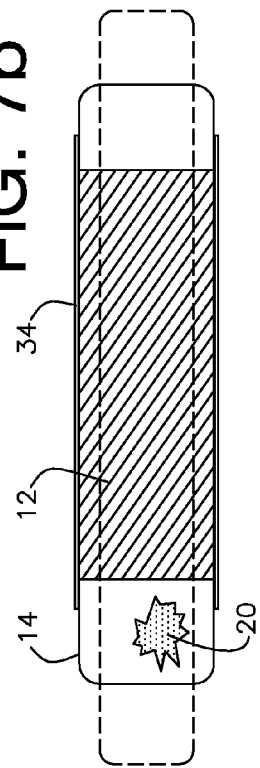
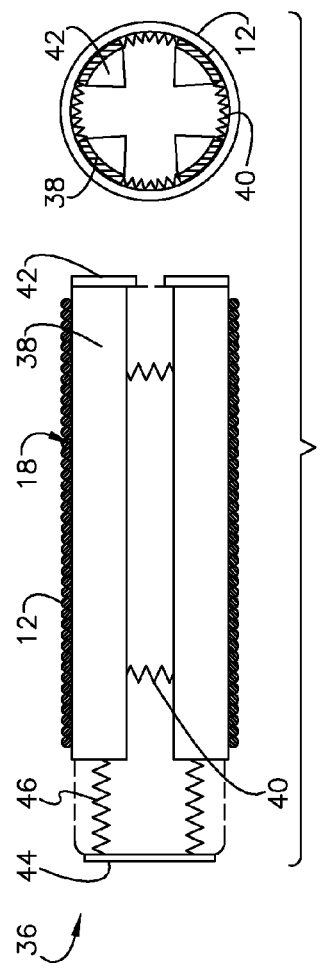

TUBULAR ACTUATORS UTILIZING ACTIVE MATERIAL ACTIVATION

BACKGROUND OF THE INVENTION

1. Field of the Invention

The present invention relates generally to tubular actuators, such as paraffin wax and electroactive polymer roll actuators, that define a stroke and shape fixity; and more particularly to a tubular actuator that utilizes active material activation to produce or modify the stroke, fixity, and/or retain the achieved configuration.

2. Discussion of the Prior Art

Tubular actuators, such as paraffin wax, pneumatic flexible tube (i.e., muscle), and electroactive polymer roll actuators, have been developed and used to actuate systems. These actuators present a shape fixity (i.e., resistance to change in shape) and define a stroke typically along the longitudinal axis, wherein the stroke is characterized by a shift in operable dimension ("stroke length"), the force produced thereby, and the period required to effect the shift ("stroke period"). These actuators present various concerns in the art. For example, it is appreciated that the constant shape fixity and stroke offered thereby prevent one-size-fits-all solutions. Moreover, conventional tubular actuators typically present tradeoffs, e.g., between stroke force and energy consumption, or stroke length and stroke period.

BRIEF SUMMARY OF THE INVENTION

Responsive to these and other concerns, the present invention recites novel tubular actuators utilizing active material activation to produce or modify its available stroke and/or retain an achieved configuration. Thus, the invention is useful for converting active material shape memorization into solenoid-type action. The invention is also useful for actuating systems that require actuators of longer stroke lengths, greater stroke forces, and/or briefer stroke periods than that which can be achieved using conventional tubular actuators; and as such, is useful for producing a given stroke using less activation energy. The invention is yet further useful for providing a tubular actuator having modifiable shape fixity that can be used to retain an achieved stroke, and as such, where zero-power hold is provided, for eliminating the tradeoff between stroke retention and energy consumption.

In a first aspect, the invention concerns an active material actuator that includes a flexible tube and externally wrapped active material element. The tube defines an interior chamber and is operable to shift between first and second configurations, so as to define a stroke. The externally wrapped element is drivenly coupled to the tube and operable to undergo a reversible change in fundamental property when exposed to or occluded from an activation signal so as to be activated or deactivated respectively. The change causes the tube to achieve the second configuration, which is operable to actuate the system.

In a second aspect, the invention concerns an electroactive polymer roll actuator that presents first and second strokes. Each stroke is defined by a stroke length and force. The actuator comprises at least one layer of electroactive polymer that is operable to undergo a first reversible change in fundamental property when exposed to or occluded from a first activation signal. Paraffin wax, operable to undergo a second reversible change in fundamental property when exposed to or occluded from a second activation signal, is disposed radially interior to at least one of said at least one layer, and may be disposed within the chamber defined by the roll. The wax presents first and second shape fixities when activated and deactivated respectively, and the fixities and first change cooperatively present the strokes.

In a third aspect, the invention concerns a method of using a tubular actuator to couple objects. The method includes a first step of positioning the tubular actuator (i.e., "coupling device") relative to the objects. The device includes an active material element operable to undergo a reversible change in fundamental property when exposed to or occluded from an activation signal. The device is shiftable between first and second radii; the first radius is greater than the second radius and hole radius; the second radius is less than the hole radius; and the change causes the device to shift between the first and second radii. The method further includes the steps of exposing to or occluding the element from an activation signal, so as to activate or deactivate the element and achieve the second radius; inserting at least a portion of the device within said at least one hole, when presenting the second radius; and reversing the change so as to cause the device to attempt to present the first radius, and thereby apply a coupling force to the objects.

Further aspects of the invention, including the use of a helical shape memory alloy external element, are further described and exemplified by the following figures and detailed description.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 5 is a cross-section and elevation of an electroactive polymer (EAP) roll actuator, including a plurality of EAP layers rolled into a tubular shape and at least one paraffin wax layer intermediate the EAP layers, wherein the EAP and paraffin layers are shown in enlarged caption, in accordance with a preferred embodiment of the invention;

FIG. 6 is an enlarged caption of an EAP roll actuator, including at least one EAP layer rolled into a tubular shape defining a central chamber, and a quantity of paraffin wax disposed within the chamber, in accordance with a preferred embodiment of the invention;

FIG. 7a is a perspective view of first and second objects engaged by a coupling device consisting essentially of a tubular actuator, in accordance with a preferred embodiment of the invention;

FIG. 7b is a cross-section of the active material coupling device shown in FIG. 7a, particularly illustrating an external flexible casing, a first exterior active material element (i.e., plurality of discrete segments), and a flexible tube shown in original configuration (i.e., when the element is deactivated) in hidden line type, and cut-away to show a second interior active material element disposed therein, in accordance with a preferred embodiment of the invention; and FIG. 8 is an elevation and cross-section of a return mechanism adapted for use with the actuator shown in FIG. 1 comprising an floating end plate and segmental protective sheath.

DETAILED DESCRIPTION OF THE PREFERRED EMBODIMENTS

Figure 1:
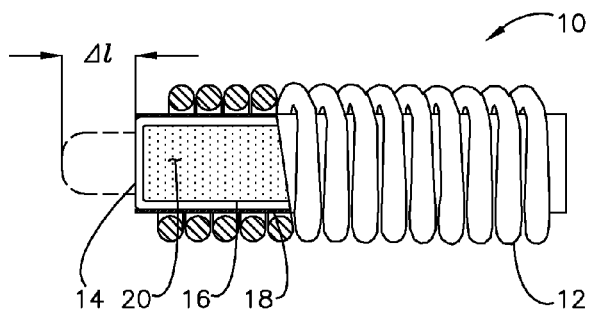
FIG. 1 is a cut-away elevation of a tubular active material actuator, including an externally wrapped active material element, a protective sheath, a flexible tube defining a central chamber, and a fluid disposed within the chamber, wherein the tube positioning after activation is shown in hidden line type, in accordance with a preferred embodiment of the invention.

Referring to FIGS. 1-8, the present invention concerns a tubular actuator 10 presenting a stroke and shape fixity (i.e. resistance to change in shape), and including at least one externally engaged active material element 12 wrapped about a flexible tube 14 or rolled about a core/chamber. In a preferred embodiment, is appreciated that the actuator 10 is operable to actuate a system (not shown) by utilizing a solenoid-type stroke to selectively engage, displace a component of, or intercommunicate a power supply (also not shown) with the system; and as such, may be used in various applications, including, for example, deployment of cargo hooks, load leveling mounts, and fixture positioning for machining, manufacturing, and assembly. In another embodiment, the invention further concerns a method of coupling disconnected objects 100 as shown in FIGS. 7a,b. The following description of the preferred embodiments is mere exemplary in nature and is in no way intended to limit the invention, its application, or uses.

I. Active Material Definition and Exemplary Compositions

The term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Suitable active materials for use with the present invention include but are not limited to shape memory alloys, shape memory polymers, electroactive polymers ("EAP"), piezoelectric composites, magnetorheological fluids, electrorheological fluids, paraffin wax, and other equivalent active materials. Depending on the particular active material, the activation signal can take the form of, without limitation, an electric current, an electric field (voltage), a temperature change, and the like.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the actuator 10 with shape memory effects, super-elastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the actuator electronically controllable. Ferromagnetic SMA's or FSMA's involve SMA's compositions that are activatable by a magnetic field as appreciated by those of ordinary skill in the art.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment. For example, the permanent shape of the polymeric material may present a spring or monolithic body having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone)dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Electroactive polymers include those polymeric materials that exhibit piezoelectric, pyroelectric, or electrostrictive properties in response to electrical or mechanical fields. An example of an electrostrictive-grafted elastomer is a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Configurations and Applications

Turning now to the structural configurations of the invention, various embodiments of a tubular actuator 10 are shown in FIGS. 1-8. A preferred embodiment of the tubular actuator 10 is shown in FIG. 1, wherein the actuator 10 is cut away to illustrate a tube 14 defining a chamber 16, longitudinal axis, and length, a protective sheath 18 externally adjacent the tube 14, and an active material element 12 externally wrapped about the protective sheath 18, so as to be drivenly engaged with the tube 14. The chamber 16 is filled with a fluidic body 20 such as a gas (e.g., air), incompressible liquid, gel, a plurality of micro-beads, or another active material as further described below. The fluidic body 20 is able to conform to the shape of the chamber 16 and transfer the radially contractive forces of the element 12 into longitudinal output. More preferably, the fluidic body 20 presents a pressurized gas.

In general, when actuation is desired, the element 12 is exposed to or occluded from an activation signal. The signal causes the element 12, shown in FIG. 1 as a helical wire, to undergo a reversible change in fundamental property. The change produces a force that causes the tube 14 to achieve a second configuration, wherein an operable dimension is lengthened, so as to produce the stroke, Δl. For example, in FIG. 1, it is appreciated that activation of the element 12 will result in the lengthening of the tube 14 along the longitudinal axis. When the activation signal is reversed, the change is likewise reversed and the tube 14 returns to its first configuration, as a result of the elasticity of the tube 14. Where thermally activated, it is appreciated that the element 12 may be passively activated in response to variations of temperature in the environment of the system; or activated on-demand via manual user input or through communication with an autonomous controller (not shown).

In this embodiment, the active material element 12 may be composed of shape memory alloy, electroactive polymer, piezoelectric composite, or the like; and present a geometric shape selected from the group consisting essentially of wires, cables, sheets, or strips. The element(s) 12 may be wrapped around the tube 14 to present various geometric configurations such as helices, weaves, braids, individual circular rings, or multiple layers. The element 12 may fully extend along or cover only a portion of the length of tube 14. For example, it is appreciated that the element 12 may present a piezoelectric outer sheet wrapped around the tube 14, so as to form a sleeve (not shown).

It is appreciated that where a wire wrapped helix is presented, the angle at which the element 12 encircles the tube 14 contributes to the degree and direction of change in the operative dimension. A wrap angle, $\alpha$, greater than fifty-five degrees as measured from the longitudinal axis (FIG. 3) produces a second configuration having a smaller radius and longer longitudinal length than the first configuration; while a wrap angle less than fifty-five degrees produces a second configuration having a larger radius and shorter longitudinal length than the first configuration.

The protective sheath 18 (FIG. 1) may be composed of a thin sheet of metal, fiberglass, Teflon, or other low friction material. The sheath 18 protects the tube 14 from cutting and/or damage, which may result from direct frictional engagement with the element 12 or from the activation signal itself. Furthermore, the sheath 18 can help distribute the actuation force created by the element 12, allowing for a more uniform change in configuration of the actuator 10. In another embodiment, at least one active material (e.g., SMA) wire 12 may be threaded into a corresponding number of thin durable tubes (not shown), which are helically wrapped around the tube 14, so as to provide protection in lieu of or in addition to the sheath 18, and enable discrete actuation.

Figure 2:
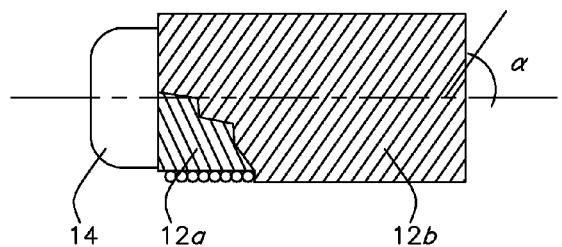
FIG. 2 is an elevation of a tubular active material actuator, including a flexible tube, and at least one active material element presenting a first layer of wire defining a first predetermined angle, and a second layer of wire defining a second predetermined angle, in accordance with a preferred embodiment of the invention.

As shown in FIG. 2, at least one external element 12 may be doubled over at least a portion of the longitudinal length of the tube 14, so as to present a greater stroke, or stroke variation. For example, the element(s) 12 may present a wire wrapped around the tube 14 to form first and second layers 12a,b. The preferred wire angle of each layer 12a,b defines a different predetermined angle, $\alpha$, where plural elements 12 are used to form each layer, and separately activated to produce the stroke variation. As previously described, it is appreciated that an actuator 10 presenting a first layer wire angle of more than fifty-five degrees and a second layer wire angle of less than fifty-five degrees will selectively achieve a wider/shorter second configuration and a narrower/longer second configuration. As such, in this configuration, a single actuator 10 presents push-pull capability from a neutral deactivated state.

Figure 3:
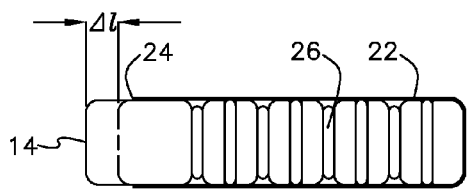
FIG. 3 is an elevation of a tubular active material actuator, including discrete active material segments externally wrapped about a flexible tube, and an inextensible outer layer defining an orifice at one end, wherein a portion of the segments have been activated, so as to cause an increment stroke, in accordance with a preferred embodiment of the invention.
Figure 4B:
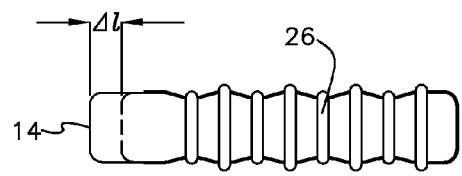
FIG. 4b is an elevation of the actuator shown in FIG. 4a, particularly illustrating the actuator in a second configuration, wherein half of the segments have been activated.
Figure 4A:
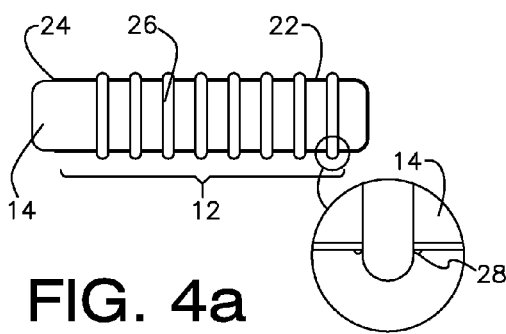
FIG. 4a is an elevation of a tubular active material actuator including a flexible tube, and a plurality of discrete active material segments, an inextensible inner layer, and shown in enlarged caption segment entraining tracks, in accordance with a preferred embodiment of the invention.
Figure 4C:
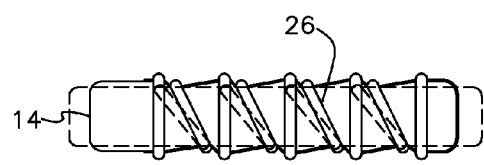
FIG. 4c is an elevation of the actuator shown in FIG. 4a, particularly illustrating the actuator in another configuration, wherein alternating sets of segments are activated.

Another example of the actuator 10 is shown in FIGS. 3-4c, wherein an active material element 12 is wrapped around the flexible tube 14 as described in FIG. 1. Here, since the element 12 (i.e., discrete segments) do not constrain radial advancement of the tube 14, the actuator 10 further includes an inextensible layer 22 externally constraining at least a portion of the tube 14, outside of or interior to the element 12. The term "inextensible" as used herein refers to a state of being unable to plastically or elastically deform in one or more dimensions (e.g., radial, axial) by the tube 14 when the element 12 is activated. More preferably, the layer 22 externally constrains the tube 14 to flex only along the operative dimension, in the manner of a tube of toothpaste. Inextensibility may be controlled or limited by, for example, the use of directional fiber reinforcements. The outer layer 22 defines one or more flexible boundary regions (e.g., membranes) or orifices 24 that function as a nozzle, preferably at a longitudinal end (FIGS. 3,4b); though it is appreciated that the orifice 24 may be placed anywhere along the tube 14, and may effect an angular stroke. The outer layer 22 functions to multiply the stroke for any given radial contraction by directing all deformation towards the operative dimension, and as such, to more efficiently produce the second configuration.

As shown in FIGS. 3-4c, the external active material element 12 may present a series of discrete segments or rings 26 individually wrapped around the tube 14, and preferably equidistance apart. To that end, the intermediate or protective sheath 18 may include or define raceways, abutments, or tracks 28 used to maintain proper element positioning (FIG. 4a). The rings 26 are separately activated to produce a wide range of possible strokes. For example, in FIG. 4b, an actuator 10 is shown with half (e.g., four of eight) of the rings 26 activated in one possible configuration.

In FIG. 4c, the rings 26 present alternating first and second sets defining wrap angles greater than and less than fifty-five degrees respectively; by alternatively activating the sets, the actuator 10 in this configuration also presents push-pull capability through a single layer of material. It is appreciated that the greater angled set must allow for radial expansion by the lesser. Finally, it is also within the ambit of the invention to use a long coil spring in place of the flexible tube 14 in each of the afore-mentioned configurations where longitudinal stroke is desired. Here, the external active material (e.g., SMA) element 12 acts upon the coil preferably through an intermediate sheath 18.

In another aspect of the tubular actuator 10, and as previously mentioned, the fluidic body 20 disposed within the chamber 16 may include a second active material element operable to undergo a reversible change in shape fixity when exposed to or occluded from a second activation signal. For example, the incompressible body 20 in this configuration may be formed of a shape memory polymer, paraffin wax, magnetorheological fluid, electrorheological fluid, or a combination of the above. In a solid state example, shape fixity generally refers to the modulus of elasticity; where in a fluidic example, shape fixity generally refers to viscosity. Thus, it is appreciated that suitable leads and/or conductive medium (not shown) operable to transfer the activation signals to the active materials 12,20 are provided, for example, at the distal ends of the chamber 16 or as a conductive medium that passes through the chamber 16.

Where an active fluidic body 20 is utilized, it is appreciated that the actuator 10 presents a two-step activation process, wherein the second element or fluidic body 20 is activated prior to activating the first element 12. In a solid state example (e.g., SMP, etc.), this results in a selectively lockable actuator 10. That is to say, when the body 20 is caused to return to its high modulus state, the external element 12 is prevented from causing the actuator 10 to achieve the second configuration or return to the first configuration. Only by activating both the first element 12 and the second element 20 can the actuator 10 achieve the desired stroke. In a fluidic example (e.g., MR/ER fluids, etc.), activation of the second element 20 may effect a modification in stroke length, stroke force, or stroke time (wherein the stroke length in the latter two are unmodified). Moreover, it is appreciated that a single signal may be used to activate both the radially contracting element 12 and active fluid 20, such as for example, where MR fluid 20 is disposed within the chamber 16 and an FSMA wire 12 is wrapped around the tube 14.

Another embodiment of the invention is shown FIG. 5, wherein the actuator 10 presents an otherwise conventional electroactive polymer ("EAP") roll formed of at least one, and more preferably a plurality of EAP layers 30. The EAP layers 30 define a central chamber 16, and include individually activated longitudinal segments 30a. When one segment is activated, the actuator 10 is caused to flex away from the activated segment 30a, so as to define a curved second configuration. It is appreciated that the number of segments 30a is directly proportional to the available degree of flexibility. As shown in FIG. 5, the actuator 10 further includes a quantity of paraffin wax, which is operable to undergo a reversible change in fundamental property (e.g., change in molecular structure/bond resulting in a large change in volume and shape fixity) when exposed to or occluded from an activation signal. In a first example, the wax forms thin layers 32 disposed intermediate the plural EAP layers 28 (FIG. 5). In another example, the paraffin wax may be disposed within the chamber 16, so as to form a wax core 20. In either example, when activated, the paraffin wax 32 will decrease in shape fixity and allow the roll actuator 10 to achieve a greater stroke.

In yet another aspect of the invention, FIGS. 7a,b depict a method of coupling objects 100 using a tubular actuator 10, as previously described and illustrated. That is to say, the coupling device 10 includes an exterior active material element 12 wrapped about a flexible tube 14 at an angle, α, less than fifty-five degrees. More preferably, the actuator 10 further includes a flexible exterior most casing 34 fixedly attached and external to the element 12. The casing 34 is configured so as to present a minimum friction force when engaged with an object 100. Again, the active material element 12 may be composed of shape memory alloy, electroactive polymer, or piezoelectric composite; and the element 12 is wrapped around and drivenly coupled, so as to radially expand the tube 14, when caused to undergo the change. More preferably, disposed within the tube 14 is a second active material element 20 having variable shape fixity properties, such as, for example, shape memory polymer, paraffin wax, magnetorheological fluid, or electrorheological fluid.

In operation, the coupling device 10 is initially caused to achieve a lesser radius and lesser shape fixity state through activation (or deactivation) of the elements 12,20 as described above. Next, the device 10 is positioned relative to the objects 100, which define holes 100a having a hole radius greater than the lesser radius. At least a portion of the device 10 is inserted through each hole 100a. The element 12 is then deactivated (or activated), while the second element or fluidic body 20 is in its lower modulus state, so that the device 10 attempts to return to a first or larger radius greater than the hole radius. The increase in the radius causes the tube 14 to engage the objects 100, so that the device 10 and objects 100 achieve a coupled state. Because the device 10 is also caused to shorten (i.e., produce a negative stroke), the objects 100 are pulled closer together. In this mode of operation, a laterally inextensible outer layer 22 is not provided, so that the portions of the device 10 that are not entrained within the holes 100a return to the larger deactivated radius. The difference between the larger radius and the hole radius defines a depression in which the objects 100 are secured and thereby fixed along the longitudinal axis of the device 10 (FIG. 7b).

It is appreciated that one of the objects 100 to be joined may be permanently fixed (e.g., through welding, bonding, riveting, etc.) to the device 10. Furthermore, the term "hole" may include cavities, channels, and/or indentations as well as pass-through holes in the objects 100 to be coupled. It is also appreciated that the second active material element 20 may have different initial states as used in this embodiment; shape memory polymer and paraffin wax are activated to present the lesser shape fixity as required, while electrorheological fluid and magnetorheological fluid are deactivated to present the lesser shape fixity.

Alternatively, the element 12 may be configured to radially contract the tube 14, where a return mechanism 36 (FIG. 8) operable to expand the tube 14 when the element is deactivated, and generate a sufficient holding force is included. As previously mentioned, it is appreciated that the elasticity of the tube 14 presents the return force that drives the actuator 10 back to the original or first configuration when the element 12 is deactivated; however, where an elastic tube 14 is unable to conform the fluid body 20, or where a non-elastic tube 14 is used, it is appreciated that a return mechanism 36 is preferably incorporated to effect automatic return. For example, in FIG. 8, the return mechanism 36 comprises a protective sheath 18 formed of spaced sectors 38 interconnected by compressive springs 40. In this configuration, the sheath 18 is operable to radially contract, e.g., as a result of activating the element 12, and expand, e.g., as a result of releasing energy stored in the springs 40 when the element 12 is deactivated.

At the non-operative end of the actuator 10, the sheath 18 preferably presents fixed cap panels 42. Here, the tube 14 may be adhered to the sheath 18 so as to be longitudinally contracted when the sheath 18 is expanded. More preferably, however, the mechanism 36 further includes a floating end plate 44 at the operative end of the actuator 10, which is interconnected to the sheath 18 by expansion springs 46. The floating plate 44, expansion springs 46, and tube 14 are cooperatively configured, such that the tube 14 causes the plate 44 to be displaced and the springs 46 to store energy, when the element 12 is activated. When the element 12 is deactivated, the springs 46 release their energy thereby causing the plate 44 and tube 14 to return to the first configuration.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A tubular active material actuator presenting a stroke length and force, said actuator comprising:
   a flexible tube defining an interior chamber and longitudinal axis, and operable to shift between first and second configurations having first and second longitudinal lengths, so as to define a stroke;
   an active material element operable to undergo a reversible change in fundamental property when exposed to or occluded from an activation signal so as to be activated or deactivated respectively, externally wrapped around and drivenly coupled to the tube; and
   a fluidic body disposed within the chamber, wherein the change produces a radial actuation force, the force causes the tube to shift between configurations, and the body is operable to transfer the force,
   wherein the fluidic body includes a second active material element operable to undergo a second reversible change in fundamental property when exposed to or occluded from a second activation signal, and the second change is operable to modify the stroke.

2. The actuator as claimed in claim 1, wherein the second active material element is operable to achieve first and second shape fixities, as a result of the second change, the first fixity enables the tube to shift to one of said first and second configurations, and the second fixity retains the tube in said one of said first and second configurations.

3. The actuator as claimed in claim 1, wherein the stroke presents a stroke length, and the second change is operable to modify the stroke length.

4. The actuator as claimed in claim 1, wherein the stroke presents a stroke force, and the second change is operable to modify the stroke force.

5. The actuator as claimed in claim 1, wherein the second active material element is selected from the group consisting essentially of paraffin wax, magnetorheological fluid, electrorheological fluid, and shape memory polymer.

6. A tubular active material actuator presenting a stroke length and force, said actuator comprising:
   a flexible tube defining an interior chamber and longitudinal axis, and operable to shift between first and second configurations having first and second longitudinal lengths, so as to define a stroke;
   an active material element operable to undergo a reversible change in fundamental property when exposed to or occluded from an activation signal so as to be activated or deactivated respectively, externally wrapped around and drivenly coupled to the tube;
   a fluidic body disposed within the chamber, wherein the change produces a radial actuation force, the force causes the tube to shift between configurations, and the body is operable to transfer the force; and
   an inextensible outer layer externally constraining at least a portion of the tube, defining a distal orifice or flexible membrane, and operable to modify the stroke, when the element is activated.

7. A tubular active material actuator presenting a stroke length and force, said actuator comprising:
   a flexible tube defining an interior chamber and longitudinal axis, and operable to shift between first and second configurations having first and second longitudinal lengths, so as to define a stroke;
   an active material element operable to undergo a reversible change in fundamental property when exposed to or occluded from an activation signal so as to be activated or deactivated respectively, externally wrapped around and drivenly coupled to the tube; and
   a fluidic body disposed within the chamber, wherein the change produces a radial actuation force, the force causes the tube to shift between configurations, and the body is operable to transfer the force,
   wherein the active material element is at least one wire wrapped about the tube at a predetermined wrap angle, so as to form at least one layer.

8. The actuator as claimed in claim 7, wherein said at least one wire presents a plurality of layers, and each layer of wire defines a discrete predetermined wrap angle.

9. The actuator as claimed in claim 7, wherein the wrap angle is not less than fifty-five degrees when measured from the longitudinal axis.

10. A tubular active material actuator presenting a stroke length and force, said actuator comprising:
   a flexible tube defining an interior chamber and longitudinal axis, and operable to shift between first and second configurations having first and second longitudinal lengths, so as to define a stroke;
   an active material element operable to undergo a reversible change in fundamental property when exposed to or occluded from an activation signal so as to be activated or deactivated respectively, externally wrapped around and drivenly coupled to the tube; and
   a fluidic body disposed within the chamber, wherein the change produces a radial actuation force, the force causes the tube to shift between configurations, and the body is operable to transfer the force,
   wherein said at least one active material element is wrapped around the tube in a geometric configuration selected from the group consisting essentially of helices, weaves, meshes, braids, and circular rings.

11. A tubular active material actuator presenting a stroke length and force, said actuator comprising:
   a flexible tube defining an interior chamber and longitudinal axis, and operable to shift between first and second configurations having first and second longitudinal lengths, so as to define a stroke;
   an active material element operable to undergo a reversible change in fundamental property when exposed to or occluded from an activation signal so as to be activated or deactivated respectively, externally wrapped around and drivenly coupled to the tube; and
   a fluidic body disposed within the chamber, wherein the change produces a radial actuation force, the force causes the tube to shift between configurations, and the body is operable to transfer the force,
   wherein the element presents a geometric form selected from the group consisting essentially of wires, cables, sheets, and strips.

12. An electroactive polymer roll actuator presenting first and second strokes, each defined by a respective stroke length and force, said actuator comprising:
   at least one electroactive polymer layer operable to undergo a first reversible change in fundamental property when exposed to or occluded from a first activation signal, and rolled to define a radially interior chamber; and
   paraffin wax operable to undergo a second reversible change in fundamental property when exposed to or occluded from a second activation signal, so as to be activated and deactivated respectively, disposed radially interior to at least one of said at least one layer,
   wherein the wax presents first and second shape fixities when activated and deactivated respectively, and the fixities and first change cooperatively present the strokes.

13. The actuator as claimed in claim 12, wherein the wax is disposed within the chamber.

14. A method of selectively coupling a plurality of objects defining at least one hole presenting a hole radius, said method comprising:
   a) positioning a coupling device relative to the objects, wherein the device includes an active material element operable to undergo a reversible change in fundamental property when exposed to or occluded from an activation signal, and is shiftable between first and second radii, the first radius is greater than the second radius and hole radius, the second radius is less than the hole radius, and the change causes the device to shift between the first and second radii;
   b) exposing to or occluding the element from an activation signal, so as to activate or deactivate the element and achieve the second radius;
   c) inserting at least a portion of the device within said at least one hole, when the device presents the second radius; and
   d) reversing the change so as to cause the device to attempt to present the first radius and therefore the device and objects to achieve a coupled state, when said at least portion is inserted within said at least one hole, wherein the device further includes a second active material element operable to undergo a second reversible change in fundamental property when exposed to or occluded from a second activation signal, the change is operable to shift the second element between first and second shape fixities, and the second fixity is operable to retain the device and objects in the coupled state, and;

step b) further includes the steps of initially activating the second element so as to enable the first change to achieve the second radius; and step d) further includes the steps of reversing the second change, after the first change is reversed, so as to cause the device to return to the first shape fixity.

* * * * *